US012521618B2

(12) United States Patent
Chen et al.

(10) Patent No.: US 12,521,618 B2
(45) Date of Patent: Jan. 13, 2026

(54) COMMUNICATION SYSTEM FOR ATHLETES OR HEARING-IMPAIRED USERS

(71) Applicants: The Quarry Lane School, Dublin, CA (US); little DESIGN LAB, San Ramon, CA (US); Corina Chen, Fremont, CA (US); Eesha Sanjay, Dublin, CA (US); Krithik Duvvuri, Tracy, CA (US)

(72) Inventors: Corina Chen, Fremont, CA (US); Krithik Duvvuri, Tracy, CA (US); Eesha Sanjay, Dublin, CA (US); Zhilu Xie, San Ramon, CA (US); Varshini Vijay, Dublin, CA (US); Ziyi Gao, Pleasanton, CA (US)

(73) Assignees: Corina Chen; Eesha Sanjay; Krithik Duvvuri; Zhilu Xie; Varshini Vijay; Ziyi Gao

( * ) Notice: Subject to any disclaimer, the term of this patent is extended or adjusted under 35 U.S.C. 154(b) by 308 days.

(21) Appl. No.: 18/333,619

(22) Filed: Jun. 13, 2023

(65) Prior Publication Data

US 2024/0416212 A1 Dec. 19, 2024

(51) Int. Cl.
*H04R 25/00* (2006.01)
*A63B 71/06* (2006.01)

(52) U.S. Cl.
CPC ......... *A63B 71/0622* (2013.01); *H04R 25/50* (2013.01); *H04R 25/554* (2013.01); *H04R 25/604* (2013.01); *A63B 2071/063* (2013.01); *A63B 2071/0655* (2013.01); *A63B 2225/50* (2013.01)

(58) Field of Classification Search
CPC .... H04R 25/50; H04R 25/554; H04R 25/604; A63B 2071/063; A63B 2071/0655; A63B 2225/50; A63B 71/0622; G08B 6/00
USPC .......................................................... 381/312
See application file for complete search history.

(56) References Cited

U.S. PATENT DOCUMENTS

| | | | | |
|---|---|---|---|---|
| 6,181,236 | B1 | 1/2001 | Schneider, Jr. | |
| 6,794,989 | B2 | 9/2004 | Naegely et al. | |
| 7,031,225 | B2 | 4/2006 | McDonald | |
| 7,839,269 | B2 | 11/2010 | Steger et al. | |
| 7,845,311 | B2 | 12/2010 | So | |
| 9,305,442 | B1 * | 4/2016 | Nesemeier | G08B 1/08 |
| 9,502,018 | B2 | 11/2016 | Cronin et al. | |
| 9,711,015 | B2 | 7/2017 | Saboune et al. | |

(Continued)

*Primary Examiner* — Phylesha Dabney
(74) *Attorney, Agent, or Firm* — Riyon Rae Harding

(57) ABSTRACT

A communication system for athletes or hearing-impaired users is disclosed. The communication system includes a triggering device having a housing to receive an electronic whistle, such that a switch cap snaps on a whistle switch to align with a triggering switch. A main switch sandwiches the triggering switch with the switch cap, such that when the first user accesses the main switch then the whistle and triggering switch are activated simultaneously for operating the electronic whistle and the triggering device in tandem to facilitate the first user for wirelessly communicating with the second users. The communication system also includes haptic wearable devices associated with second users and having a radio transceiver to receive the transmitted radio frequency signal and generate a vibration to notify the second user about the one or more instructions by the first user.

29 Claims, 11 Drawing Sheets

(56) References Cited

U.S. PATENT DOCUMENTS

| | | | | |
|---|---|---|---|---|
| 10,032,345 | B2 | 7/2018 | Grant et al. | |
| 10,532,266 | B2 | 1/2020 | Genova | |
| 10,799,785 | B2 | 10/2020 | Baillie | |
| 2005/0162257 | A1 | 7/2005 | Gonzalez | |
| 2017/0069181 | A1* | 3/2017 | Nesemeier | G06F 21/62 |
| 2018/0302948 | A1* | 10/2018 | Kotlyarov | H04M 1/23 |
| 2022/0379189 | A1 | 12/2022 | Carroll | |

* cited by examiner

COMMUNICATION SYSTEM FOR ATHLETES OR HEARING-IMPAIRED USERS

BACKGROUND

Technical Field

The present disclosure relates to the field of sports management, and in particular, relates to a communication system for athletes or hearing-impaired users.

Description of the Related Art

Typically, sounds produced from whistles such as traditional blowing whistles or modern electronic whistles are used for communicating instruction to athletes. However, in some of the sports such as soccer and basketball, the loud noise of the spectators may prevent the athletes from clearly hearing the whistle sound. As the athletes (also referred to as players) don't get the sounds from the whistle, they may miss important instructions that may affect the flow of the game. Further, users with hearing loss or with hearing issues (such as hearing-impaired athletes) may face such scenarios more often than others. Hearing loss is a reality that pervasively impacts all aspects of a deaf individual's life, and athletes with hearing loss face a unique set of challenges that are not yet adequately addressed. For example, basketball players who are hard of hearing may run into difficulties in responding to sound signals (e.g., court signals, umpire instructions, coach instructions, etc.) that they are unable to notice. Hearing loss does not affect athletic ability in any way, but only the ability to clearly take instructions, which negatively affects the overall flow of the game, as the athlete may not be able to respond to those sound signals on time. For example, a player in a team who is deaf or hard of hearing may be oblivious to the referee's whistles and calls. The player with hearing issues often needs more time to notice and respond. Coaches find it difficult when they need to coordinate a new strategy but cannot efficiently get the attention of all the team members. Sports officials and coaches who are inexperienced at accommodating deaf athletes may feel awkward and cause miscommunications that impact the pace and overall experience of the game. These potentially uncomfortable experiences may limit future opportunities and success for a deserving team.

As of now, there is no solution that is universally accepted by sports officials to accommodate these athletes. The United States patent publication no. US 2016/171846 A1, titled "WEARABLE HAPTIC FEEDBACK DEVICES AND METHODS OF FABRICATING WEARABLE HAPTIC FEEDBACK DEVICES" describes a wearable haptic feedback cap that can be used by athletes in certain games. This device is of no use to athletes of football, basketball or other such games that do not require or approve the usage of a cap. There are other products, such as V-Sports, and "Unitact Bracelet" to assist people with hearing loss, but these products are not optimized for use in sports settings because of the challenges, such as time delays, safety issues, interference in-game, limited range of motion, user interface difficulties, and incompatibility with existing sports equipment. A few existing solutions employ haptic functions to facilitate communication, but design flaws such as bulky or fragile casing and limited potential prevent them from being easily incorporated into an athlete's life. These issues can be properly rectified with better technology, ergonomic design and solutions to communicate instructions or signals from off the field to athletes in the field to ensure a gracious experience for all people involved.

Therefore, there is a need for an improved communication system for athletes or hearing-impaired users that overcomes the abovementioned drawbacks.

BRIEF SUMMARY

One or more embodiments are directed to a triggering device and a communication system for athletes or hearing-impaired users. The disclosure aims to mitigate in-game difficulties encountered by athletes or difficultly encountered by hearing-impaired users through an interconnected communication system. The communication system consists of a triggering device that can be used by a first user (such as a coach or a referee) and one or more haptic wearable devices worn by a second set of users (such as players and athletes). When a first user wants to get attention from any or all of the second set of users, the first user activates the triggering device in a certain manner that instantly sends a signal to a respective haptic wearable device strapped to the ankle of the corresponding user of the second set of users to generate haptic feedback through a vibration pattern corresponding to the signal. The haptic wearable device may generate different vibration patterns, each corresponding to a specific signal based on pre-configuration. The vibration patterns are customized to the liking of the second set of users (e.g. players of a team), and each pattern correlates to predefined messages. Such messages may be any generic instructions or in-game instructions, such as messages corresponding to the start of a game, foul play, assemble together, the end of a play or any instruction from the coach or the referee.

An embodiment of the present disclosure discloses a triggering device for a communication system. The triggering device includes a triggering switch that may be activable by a first user to convey instructions wirelessly to at least one second user. The triggering switch may be a pressable switch, a touch-sensitive switch, a Single Pole Single Throw (SPST), a Single Pole Double Throw (SPDT), a Double Pole Single Throw (DPST), or a Double Pole Double Throw (DPDT). Accordingly, the activation of the triggering switch may be performed by way of user pressing, pushing, and/or touching the triggering switch. The triggering device further includes a processing unit to generate a first control signal for the generation of a sound and a second control signal for generation of a radio frequency signal in response to the activation of the triggering switch. The radio frequency signal generates haptic feedbacks through a corresponding haptic wearable device. Such generation of the control signals may be based on the type of activation by the first users, such as the control signal generated for a single press may be different from a double press which in turn may be different from a mere touch or triple press.

Further, the triggering device includes a sound generation unit such as an electronic whistle, an active buzzer, or a passive buzzer of the triggering device, to generate the sound for communicating with the at least one second user. The sound generation unit may generate sound based on the first control signal. The triggering device also includes a radio transceiver to generate and transmit the radio frequency signal based on the second control signal. Further, the transmitted radio frequency signal may be received by the one or more haptic wearable devices associated with the at least one second user to generate haptic feedbacks for notifying the at least one second user about the one or more instructions by the first user.

An embodiment of the present disclosure discloses a communication system for athletes or hearing-impaired users. The communication system may include one or more triggering devices associated with one or more first users (such as referees) and one or more haptic wearable devices associated with one or more second users (such as athletes). In some embodiments, the triggering device may have a housing that has an inside hole, a switch cap, the triggering switch, a main switch, a pairing switch, the processing unit, and the radio transceiver. The pairing switch facilitates the pairing of the triggering device with the one or more haptic wearable devices, such as by way of pressing, sliding, or touching. For example, the pairing switch may be pressed once or twice for pairing with the one or more haptic wearable devices. Such pairings can be by way of any wireless technology like, without any limitation, Bluetooth, Infrared, or Zigbee. Further, the triggering switch may facilitate the first user (such as a coach, a team member, or an official) to activate the triggering device. When the first user accesses the triggering switch, then the processing unit may control the radio transceiver to produce a radio frequency corresponding to the first user inputs. Such radio frequency may be transmitted, via a spring antenna, the one or more haptic wearable devices, associated with the one or more second users (such as athletes or hearing-impaired users) to facilitate the first user to wirelessly communicate one or more instructions (such as game instructions like foul and team instructions like strategy) to the one or more second users.

In some embodiments, the triggering device may be a self-contained device and the housing may receive an electronic whistle to be coupled together. The housing may have one or more connectors to secure the electronic whistle. The electronic whistle may be any of the pre-existing handheld products that allow for whistle instructions to be given through the activation of a switch without physically being in the user's mouth. It may be apparent to a person skilled in the art to modify the traditional blow whistle, that generates sound on blowing of air, to activate the triggering device by way of the blowing of the air and perform similarly without departing from the scope of the invention. During the coupling, the switch cap protrudes outwards from the inside hole and snaps on top of a whistle switch to secure the whistle switch of the electronic whistle. When activated, the whistle switch triggers a generation of a sound for communicating with at least one second user. Further, the triggering switch may be placed above the inside hole to align with the whistle switch for operating in tandem. When activated, the triggering switch triggers a generation of a radio frequency signal for communicating with the at least one second user to give one or more instructions. In an embodiment, the triggering device's switch is placed directly above that of the electronic whistle to allow for a single action to activate both the electronic whistle and the triggering device. As a result, during operation, the electronic whistle will emit a high-pitched whistle tone and the triggering device will send a wireless signal instructing the haptic wearable device to vibrate. The switches such as the whistle switch, the triggering switch, and the main switch may include a pressable switch, a touch-sensitive switch, a Single Pole Single Throw (SPST), a Single Pole Double Throw (SPDT), a Double Pole Single Throw (DPST), a Double Pole Double Throw (DPDT), or a combination thereof.

In some embodiments, the triggering switch may have one or more distinct activations associated with one or more distinct instructions intended by the first user. The first user may, without any limitation, be a team member, a coach, and a match official. Additionally, the main switch sandwiches the triggering switch with the switch cap and is secured by a switch lid, such that when the first user utilizes the main switch to activate the whistle switch and the triggering switch are activated simultaneously for operating the electronic whistle, and the triggering device in tandem to facilitate the first user for wirelessly communicating with the at least one second user to give instructions. The processing unit may be affixed below the radio transceiver for controlling the radio transceiver to generate and transmit a radio frequency signal in response to the activation of the main switch. In some embodiments, the triggering device may further include a spring antenna coupled to the radio transceiver to boost transmission range of the generated radio frequency signal and one or more batteries to supply operation power to one or more components of the triggering device.

In some embodiments, each of the one or more haptic wearable devices connects with at least two triggering devices at a point of time. Further, each of such at least two triggering devices may form an exclusive radio channel to prevent interference between the communication of each other. Each of the one or more haptic wearable devices includes a radio transceiver to receive the transmitted radio frequency signal and a vibration motor to generate a vibration based on the received radio frequency signal to notify the at least one second user about the one or more instructions by the first user. In some embodiments, each of the one or more haptic wearable devices includes a haptic wearable device casing to encase a processing unit, the one or more rechargeable batteries, the radio transceiver, the vibration motor, or a combination thereof. In some embodiments, the vibration motor may be an Eccentric Rotating Mass (ERM) vibration motor or a Linear Resonant Actuator (LRA) vibration motor for providing haptic output to the athlete via one or more vibrations. Further, the haptic wearable device includes a haptic wearable device lid to snap on top of the haptic wearable device casing and has extrusions on an underside that contour to compartments of the haptic wearable device casing underneath for preventing its sliding around.

In some embodiments, the haptic wearable device casing is a 3D rectangular casing having ports on the sides for an ON/OFF switch, a pairing button, a Light Emitting Diode (LED) indicator, and a micro-Universal Serial Bus (USB) port to recharge one or more rechargeable batteries to supply operational power to the encased components. The pairing button facilitates the pairing of the haptic wearable device with triggering devices, such as by way of pressing, sliding, or touching. For example, the pairing button may be pressed once or twice for pairing with the triggering device. Such pairings can be by way of any wireless technology like, without any limitation, Bluetooth, Infrared, or Zigbee. Further, each of the one or more haptic wearable devices includes a custom-sewn fabric band adjustable using a Velcro and having a layer of foam padding on the exterior to prevent hazards and collisions with solid haptic wearable device casing. Further, the band includes a pouch to secure the haptic wearable device casing. In some embodiments, the vibration motor may be contained within the haptic wearable device casing, such that the haptic wearable device is contained in a single casing. In other embodiments, the custom-sewn fabric band further includes a separate small pouch to store the vibration motor. In some additional embodiments, the vibration motor may be separate from the haptic wearable device casing with flexible wings that may be made from Thermoplastic polyurethane (TPU) plastic. The haptic wearable casing may have an indent for the vibration motor to rest in and the flexible wings may be intended to add structure to the haptic wearable device. Further, the flexible wings may also allow wrapping of the haptic wearable device around the at least one second user's ankle when it is worn.

The proposed communication system may be implemented into the intense environment of a basketball game, a football game, a volleyball game, a soccer game, a baseball game, a hockey game, a tennis match, a cricket match, etc complying with official standards. In some embodiments, the haptic wearable device is a durable and ergonomic combination of technology and athletic wear that will be situated on the athlete's ankle. Further, the vibration patterns are generated via a vibration motor that is encased within a slim casing model along with its electrical components, all of which are contained in a custom-tailored pouch with an adjustable band for a comfortable fit. It may be apparent to a person skilled in the art that padding and safety measures may be incorporated in accordance with the policies of official authorities. Accordingly, the disclosure may be a medium not only between players and officials but between those with and without hearing loss. In the end, the goals are not just to improve the game itself, but to increase the opportunities for these athletes so everyone can compete, experience, and enjoy the world of sports at an equal level by reducing miscommunications via harnessing technology to create a universally implemented system that bridges between these groups.

The features and advantages of the subject matter here will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGURES and examples are not meant to limit the scope of the present subject matter to a single embodiment, but other embodiments are possible by way of interchange of some or all of the described or illustrated elements and, further, wherein.

Figure 1:
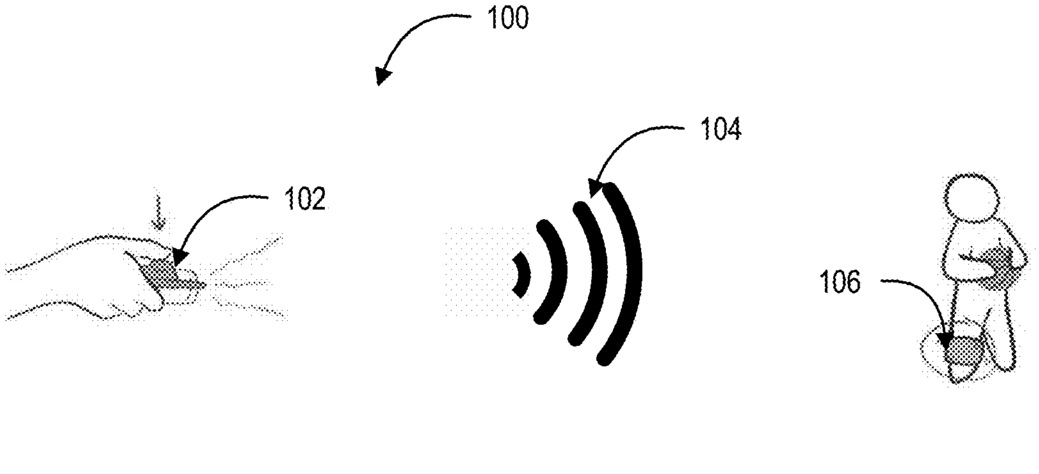
FIG. 1 illustrates communication system for athletes or hearing-impaired users, in accordance with an embodiment of the present disclosure.

Other features of embodiments of the present disclosure will be apparent from accompanying drawings and detailed description that follows.

DETAILED DESCRIPTION

In the following description, for purposes of explanation, numerous specific details are set forth in order to provide a thorough understanding of the present disclosure. It will be apparent, however, to one skilled in the art that the present disclosure is not limited to these specific details. In other instances, structures and devices are shown in block diagram form only in order to avoid obscuring the present technology.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection.

Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Embodiments described herein may be discussed in the general context of computer-executable instructions residing on some form of computer-readable storage media, such as program modules, executed by one or more computers or other devices. By way of example, and not limitation, computer-readable storage media may include non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, the flowchart and block diagrams in the Figures illustrate the architecture, functionality, and operation of possible implementations of apparatus (systems), methods, and computer program products according to various implementations of the present disclosure. Each block in the flowchart and/or block diagrams, and combinations of blocks in the flowchart and/or block diagrams, may represent a module, segment, or portion of code, which includes one or more executable computer program instructions for implementing the specified logical function (s)/act(s). These computer program instructions may be provided to a processing unit of a general-purpose computer, special-purpose computer, or other programmable data processing apparatus to produce a machine, such that the computer program instructions, which may execute via the processing unit of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of order noted in the figures. For example, two blocks shown in succession may, in fact, be executed substantially concurrently, or the blocks may sometimes be executed in the reverse order, depending upon the functionality involved.

Embodiments of the present disclosure include various steps, which will be described below. The steps may be performed by hardware components or may be embodied in machine-executable instructions, which may be used to cause a general-purpose or special-purpose processing unit programmed with the instructions to perform the steps. Alternatively, steps may be performed by a combination of hardware, software, firmware, and/or by human operators.

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a communication system for athletes or hearing-impaired users having a triggering device having a housing that has an inside hole, a switch cap, a triggering switch, a main switch, a processing unit, and a radio transceiver. The housing receives a sound generation unit such as an electronic whistle (or an active buzzer, or a passive buzzer), such that the switch cap protrudes outwards from the inside hole and snaps on top of a whistle switch to secure the whistle switch of the electronic whistle. The whistle switch, when activated, triggers a generation of a sound for communicating with the at least one second user. Further, the triggering switch is placed above the inside hole to align with the whistle switch for operating in tandem. The triggering switch, when activated, triggers a generation of a radio frequency signal for communicating with the at least one second user to give one or more instructions. Furthermore, the main switch sandwiches the triggering switch with the switch cap and is secured by a switch lid, wherein the first user accesses the main switch for simultaneously activating the whistle switch and the triggering switch for operating the electronic whistle and the triggering device in tandem to facilitate the first user for wirelessly communicating with the at least one second user to give one or more instructions. The processing unit that is affixed below the radio transceiver for controlling the radio transceiver to generate and transmit a radio frequency signal in response to the activating of the main switch. The communication system further includes one or more haptic wearable devices associated with at least one second user. Each of the one or more haptic wearable devices includes a radio transceiver to receive the transmitted radio frequency signal and a vibration motor to generate a vibration based on the received radio frequency signal to notify the at least one second user about the one or more instructions by the first user.

FIG. 1 illustrates a communication system 100 for athletes or hearing-impaired users, in accordance with an embodiment of the present disclosure. The communication system 100 may include a triggering device 102 connected, via a wireless network 104, with one or more haptic wearable devices 106. The wireless network, for the purpose of the disclosure, may include a radio transmission network, Bluetooth, ZigBee, Wi-Fi, Infrared network, or the like. The triggering device 102 may be associated with a first user such as a team member, a coach, or a match official and the one or more haptic wearable devices 106 may be associated with one or more second users. Each of the one or more second users may, without any limitation, include an athlete (such as on-field players, players in tunnel, and players on bench) and a hearing-impaired user. The triggering device 102 may include at least a triggering switch, a processing unit, a radio transceiver, and a spring antenna. When the first user activates the triggering switch then the processing unit instructs the radio transceiver to generate a radio frequency corresponding to the first user activation data such as, without any limitation, a single press, a double press, and a long press. Such radio frequency may be transmitted to the one or more haptic wearable devices via the spring antenna to communicate one or more instructions to the one or more second users. In an embodiment, each of the one or more haptic wearable devices 106 may connect with at least two triggering devices 102 at a point of time. Further, each of such at least two triggering devices 102 may form an exclusive radio channel to prevent interference between the communication of each other.

The one or more haptic wearable devices 106 may be worn by one or more second users on a part of their bodies such as hands, legs, back, waist, or the like. Such one or more second users may be associated with a sport such as football, soccer, volleyball, basketball, baseball, hockey, tennis, and cricket. Further, each of the one or more haptic wearable devices may connect with two or more triggering devices and may include a radio transceiver, a processing unit, and a vibration motor. The radio transceiver receives the transmitted radio frequency from the connected triggering device and the processing unit converts the received radio frequency to produce a corresponding vibration via the vibration motor. Further, each of the one or more wearable devices is strapped to the body part of the player, through a pouch and a Velcro belt, such that the vibration motor is in indirect contact with the player's body. As a result, the vibration produced by the vibration motor provides haptic feedbacks to the first user corresponding to the instructions by the first user.

In an embodiment, the triggering device 102 may fit with an electronic whistle of the first user, such as a team member, a coach, and a match official. It may be apparent to a person skilled in the art that the electronic whistle may correspond to a type of whistle that operates on a battery and emits a sound when the first user activates a corresponding switch. Such activation may be associated with, without any limitation, pressing, sliding, or touching the corresponding switch. During operation, when the first user activates the switch on the triggering device 102, then the electronic whistle emits an artificial whistle sound and the triggering device 102 wirelessly transmits a radio frequency signal to the one or more haptic wearable devices 106. Upon receiving the transmitted radio frequency signal, each of the one or more haptic wearable devices 106 may process the transmitted radio frequency signal to produce a corresponding vibration through a vibration motor. The produced corresponding vibration provides a haptic notification for the at least one second user about one or more instructions by the first user.

Figure 2A:
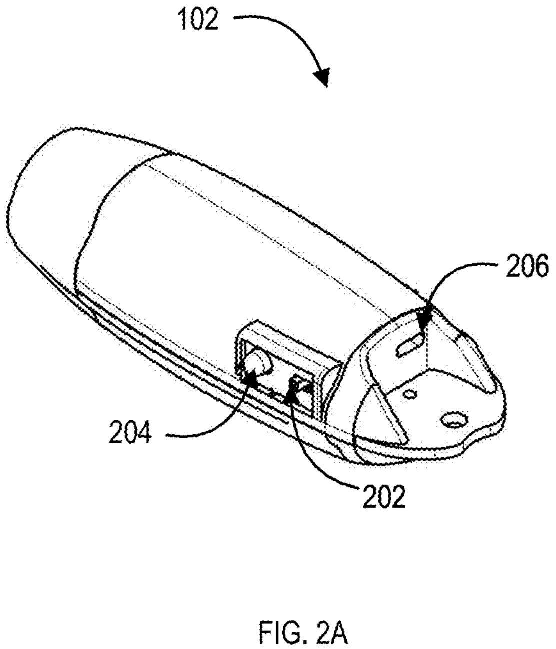
FIG. 2A illustrates a perspective view of a triggering device, in accordance with an embodiment of the present disclosure.
Figure 2B:
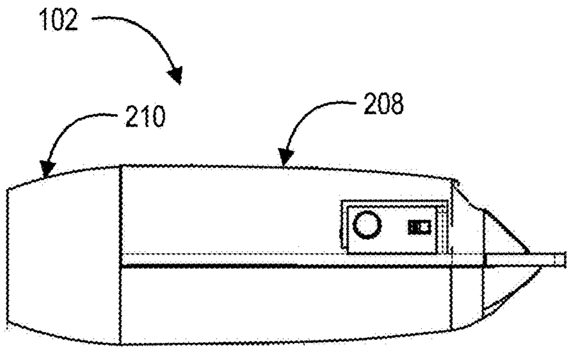
FIG. 2B illustrates a side view of the triggering device, in accordance with an embodiment of the present disclosure.
Figure 2C:
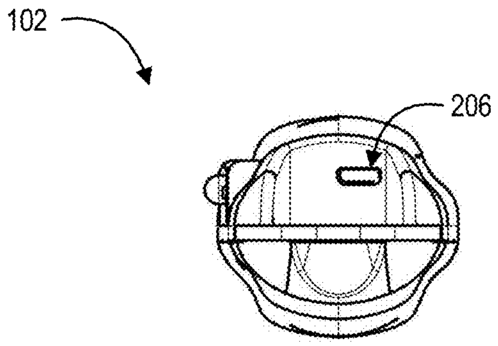
FIG. 2C illustrates a top view of the triggering device, in accordance with an embodiment of the present disclosure.
Figure 2D:
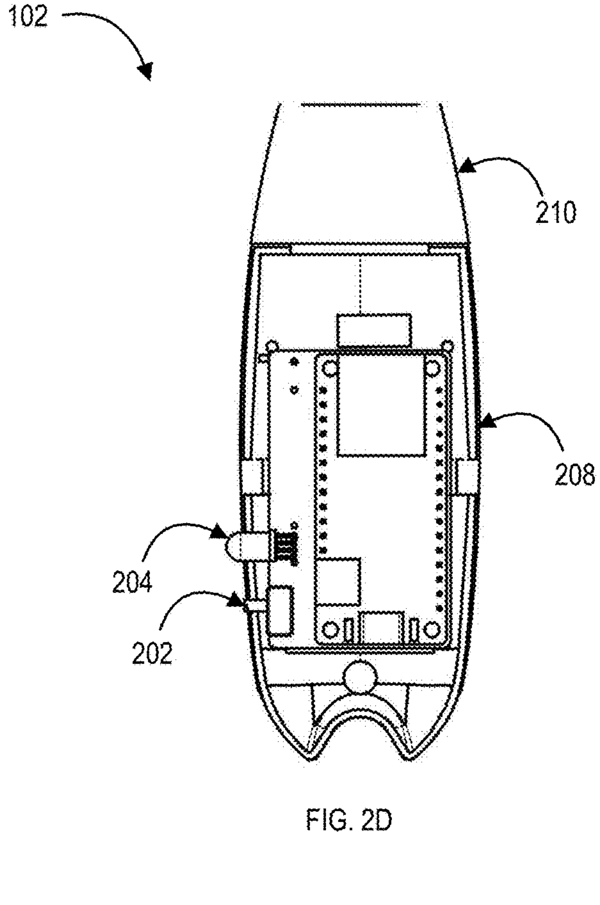
FIG. 2D illustrates a cross-sectional view of the triggering device, in accordance with an embodiment of the present disclosure.
Figure 2E:
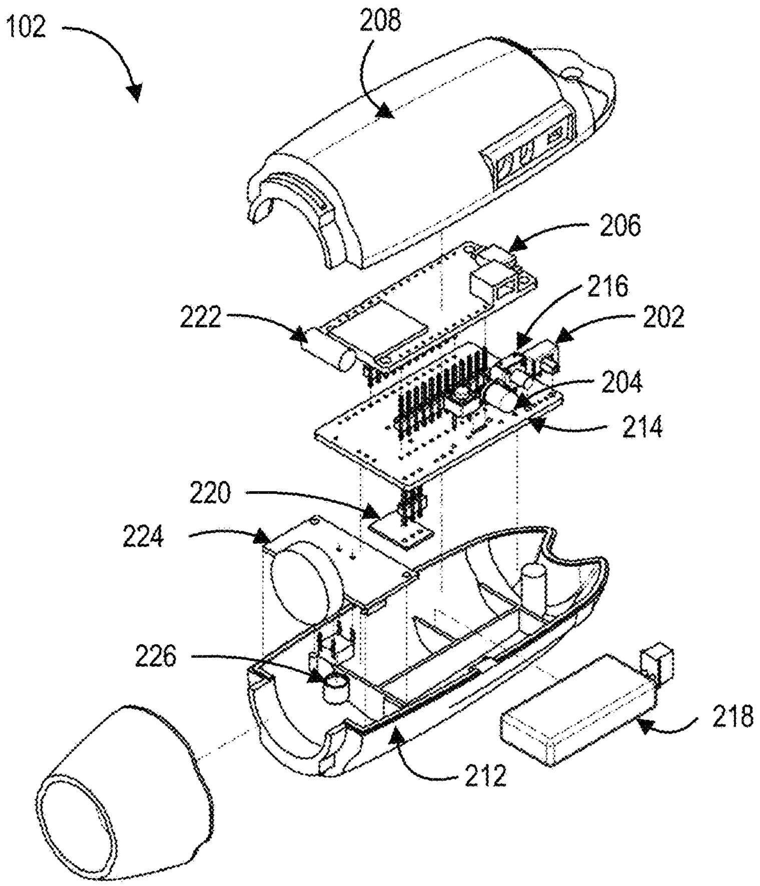
FIG. 2E illustrates an exploded view of the triggering device, in accordance with an embodiment of the present disclosure.

FIG. 2A illustrates a perspective view of the triggering device 102, in accordance with an embodiment of the present disclosure. FIG. 2B illustrates a side view of the triggering device 102, in accordance with an embodiment of the present disclosure. FIG. 2C illustrates a top view of the triggering device 102, in accordance with an embodiment of the present disclosure. FIG. 2D illustrates a cross-sectional view of the triggering device 102, in accordance with an embodiment of the present disclosure. FIG. 2E illustrates an exploded view of the triggering device 102, in accordance with an embodiment of the present disclosure. For the sake of brevity, FIGS. 2A-2E have been explained together.

In an embodiment of the present disclosure, the triggering device 102 has an ON/OFF switch 202, a Light Emitting Diode (LED) indicator 204, and a micro-Universal Serial Bus (USB) port 206. The ON/OFF switch 202, the LED indicator 204, and the micro-USB port 206 may be housed inside a housing 208 that may receive an electronic whistle 210. In one exemplary design, as illustrated in FIGS. 2A-2E, the triggering device 102 and the electronic whistle 210 may couple in a way, such that the housing 208 work as a cover for the electronic whistle 210. Consequently, the overall design may be seamless, compact, and easy to use. The ON/OFF switch 202 may facilitate the first user to turn ON or turn OFF the triggering device 102 and/or the electronic whistle 210. Further, such status of ON or OFF may be indicated via the LED indicator 204, for example, the LED indicator 204 may be red when the triggering device 102 is turned OFF and may be green when the triggering device 102 may be turned ON. In some embodiments, the triggering device 102 may include one or more batteries, such as rechargeable batteries for supplying operation power to one or more components of the triggering device 102 and/or the electronic whistle 210. The micro-USB port 206 may facilitate connecting the charging cable with the one or more batteries for recharging.

In some embodiments, as illustrated in FIG. 2E, the triggering device 102 may include the housing 208 and a bottom casing 212 to encase a printed circuit board (PCB) 214 having the ON/OFF switch 202, Light Emitting Diode (LED) indicator 204, a micro-Universal Serial Bus (USB) port 206, a pairing switch 216, a battery 218, a transformer 220, a spring antenna 222, a buzzer 224, and a button lid 226. The pairing switch 216 may facilitate the pairing of the triggering device 102 with the one or more haptic wearable devices 106, such as by way of pressing, sliding, or touching. For example, the pairing switch 216 may be pressed once or twice for pairing with the one or more haptic wearable devices 106. Such pairings can be by way of any wireless technology like, without any limitation, Bluetooth, Infrared, or Zigbee. Further, the spring antenna 222 may facilitate the transmission of the radio frequency signal from the triggering device 102 to the one or more haptic wearable devices 106. In an embodiment, during the transmission of the radio frequency signal, the triggering device 102 may also generate sound for instructing the at least one second user. Such sound may be generated by either of the electronic whistle 210 or the buzzer 224 of the triggering device 102. The buzzer 224 may be an active buzzer or a passive buzzer and may be activated to generate sound on the pressing of a switch secured by the button lid 226.

Figure 3A:
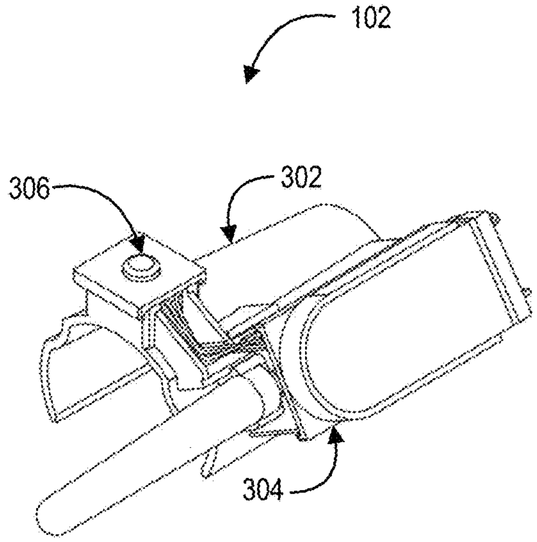
FIG. 3A illustrates a perspective view of the triggering device, in accordance with another embodiment of the present disclosure.
Figure 3B:
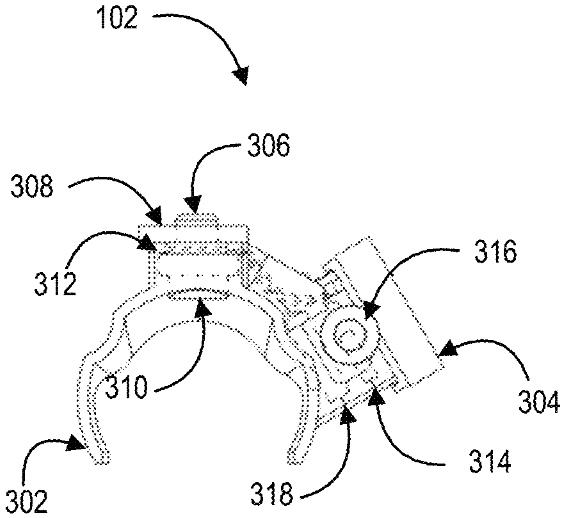
FIG. 3B illustrates a top view of the triggering device, in accordance with another embodiment of the present disclosure.
Figure 3C:
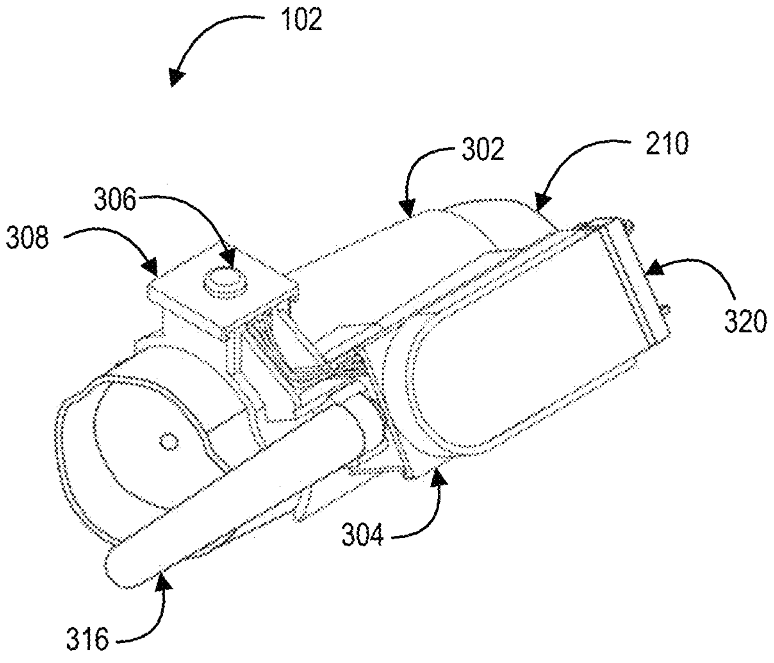
FIG. 3C illustrates a perspective view of the triggering device with an electronic whistle, in accordance with another embodiment of the present disclosure.

FIG. 3A illustrates a perspective view of the triggering device 102, in accordance with another embodiment of the present disclosure. FIG. 3B illustrates a top view of the triggering device 102, in accordance with another embodiment of the present disclosure. FIG. 3C illustrates a perspective view of the triggering device 102 with the electronic whistle 210, in accordance with another embodiment of the present disclosure. For the sake of brevity, FIGS. 3A-3C have been explained together. In an embodiment, as illustrated in FIGS. 3A-3C, the housing 208 of the triggering device 102 may include one or more connectors 302, a triggering device lid 304, a main switch 306, a switch lid 308, a switch cap 310, a triggering switch 312, a radio transceiver 314, an antenna 316 (such as the spring antenna 222), a processing unit 318, and a battery holder 320. In an embodiment, the whistle switch, the main switch 306, and the triggering switch 312 may be a pressable switch, a touch-sensitive switch, a Single Pole Single Throw (SPST), a Single Pole Double Throw (SPDT), a Double Pole Single Throw (DPST), and a Double Pole Double Throw (DPDT). Accordingly, such switches may be activated by, without any limitation, press inputs, push inputs, or touch inputs.

In an embodiment of the present disclosure, the one or more connectors 302 may secure the electronic whistle 210. The one or more connectors 302 may include, brackets, male-female connectors, circular connectors, and fabric/velcro strap connectors that wrap around the electronic whistle 210. In some scenarios, the one or more connectors 302 may also correspond to the utilization of adhesives and/or making corresponding grooves on the triggering device 102 and the electronic whistle 210. In an embodiment of the present disclosure, the housing 208 may have an inside hole that may be placed in such a way that it receives a whistle switch (not shown) of the electronic whistle 210 during coupling with the triggering device 102. Further, the switch cap 310 may protrude outwards from the inside hole and snaps on top of the whistle switch to secure the whistle switch. It may be noted that the whistle switch triggers a generation of a sound for communicating with the at least one second user when activated such as by direct or indirect physical pressing.

In an embodiment of the present disclosure, the triggering switch 312 may be placed above the inside hole to align with the whistle switch for operating in tandem. The triggering switch 312 triggers a generation of a radio frequency signal for communicating with the at least one second user to give one or more instructions when activated. In an embodiment, the triggering switch may have one or more distinct activations associated with one or more distinct instructions intended by the first user. Such activations may be associated with presses for example, a single press, a double press, a triple press, a long press, a short press, or the like that may all correspond to different instructions such as foul, offside, free throw, and tap. In an embodiment of the present disclosure, the main switch 306 sandwiches the triggering switch 312 with the switch cap 310, such that when the first user activates the main switch 306 for simultaneously activating the whistle switch and the triggering switch 312 for operating the electronic whistle and the triggering device 312 in tandem. As a result, the first user is facilitated with wirelessly communicating with the at least one second user to give instructions. In some embodiments, the main switch 306 may be secured by the switch lid 308, such that the first user accesses the main switch 306 for triggering the triggering device 312.

In an embodiment, the processing unit 318 may be affixed below the radio transceiver 314 for controlling the radio transceiver 314. The processing unit 318 along with the radio transceiver 314 may be responsible for generating and transmitting a radio frequency signal in response to the activating of the main switch 306. In an embodiment, the processing unit 318 may identify the switch activation for the triggering switch 102, as elaborated above, to trigger the radio transceiver 314 to generate a corresponding radio frequency signal. In an embodiment, the processing unit 318 may perform such triggering by generating a first control signal for triggering the sound generation unit to generate a sound and by generating a second control signal for triggering the radio transceiver 314 for generating the radio frequency signal. Further, the antenna 316 may be coupled to the radio transceiver 314 to boost the transmission range of the generated radio frequency signal to reduce delay and/or to improve the quality of communication between the triggering device 102 and the one or more haptic wearable devices 210. In an embodiment of the present disclosure, the battery holder 320 may hold the one or more batteries that supply the operation power to one or more components of the triggering device 102.

In an embodiment of the present disclosure, the processing unit 318 may be an Arduino Nano processor, and the radio transceiver 314 may be an nRF24L01 radio transceiver. Further, the battery holder 320 may store two coin cell batteries in a circuit that may be wired to the processing unit 318 to power it and may be toggled on and off using the ON/OF switch 202. It may be apparent to a person skilled in the art that the triggering device 102 is considered "ON" when the battery holder 320 is toggled ON, and "OFF" when the battery holder 320 is switched off. Further, two leads are connected to power and ground. The opposite lead is wired to another pin on the processing unit 318. In some embodiments, the radio transceiver 314 may rest lightly on top of the Arduino Nano processor inside a compartment of the housing 208. In some embodiments, the wires may run along the walled passageways with excess wires being folded within the compartments. In an embodiment, the triggering device lid 304 may be attached on top of the processing unit 318 and the radio transceiver compartment to hold the components in place.

Figure 4A:
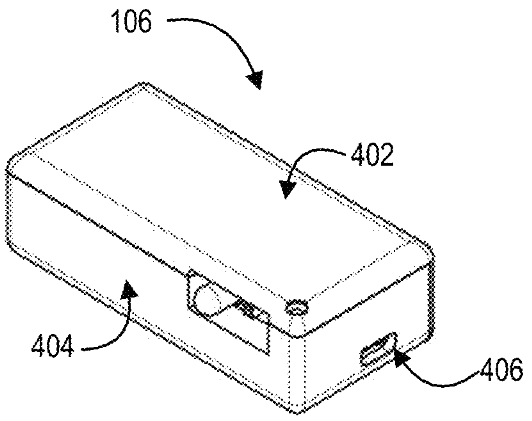
FIG. 4A illustrates a perspective view of a haptic wearable device, in accordance with an embodiment of the present disclosure.
Figure 4B:
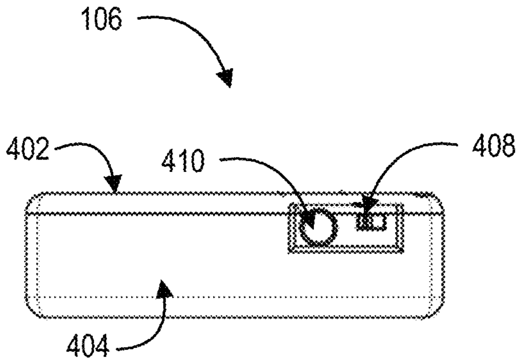
FIG. 4B illustrates a side view of the haptic wearable device, in accordance with an embodiment of the present disclosure.
Figure 4C:
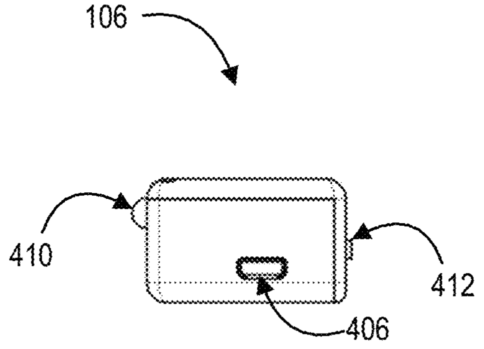
FIG. 4C illustrates a top view of the haptic wearable device, in accordance with an embodiment of the present disclosure.
Figure 4D:
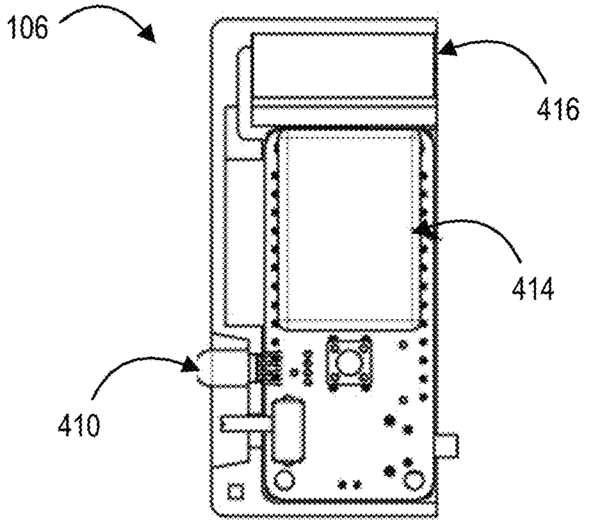
FIG. 4D illustrates a cross-sectional view of the haptic wearable device, in accordance with an embodiment of the present disclosure.
Figure 4E:
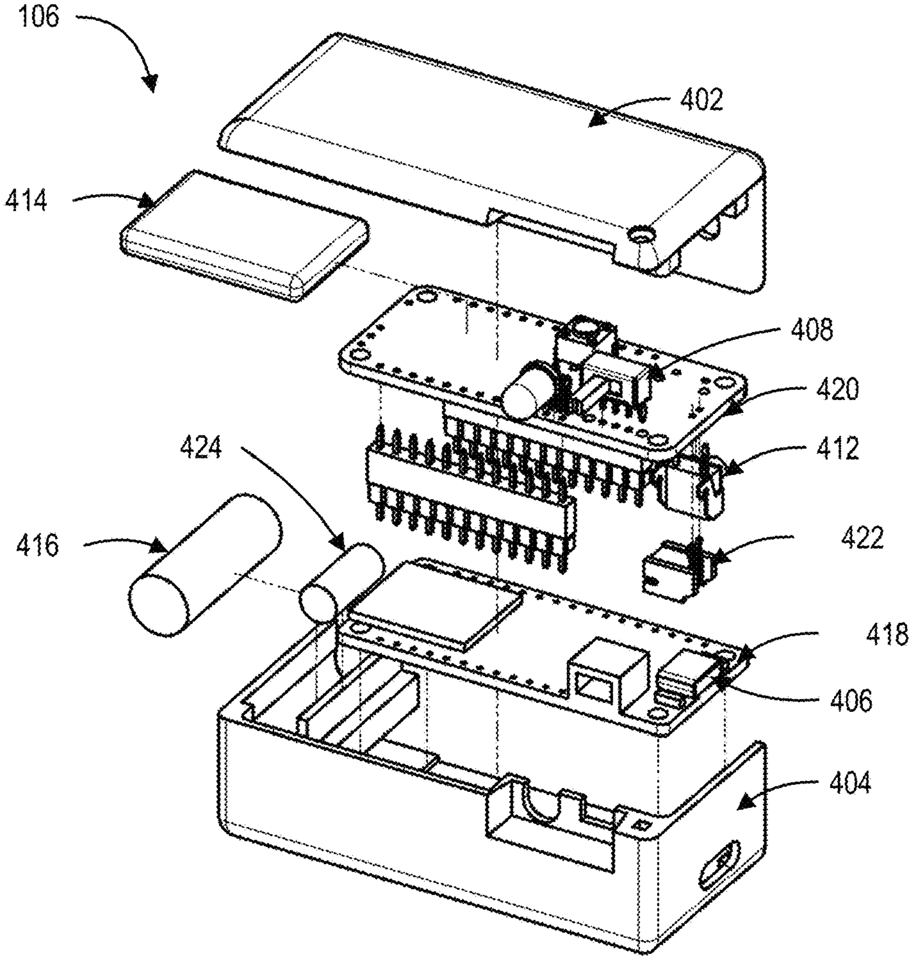
FIG. 4E illustrates an exploded view of the haptic wearable device, in accordance with an embodiment of the present disclosure.

FIG. 4A illustrates a perspective view of the haptic wearable device 106, in accordance with an embodiment of the present disclosure. FIG. 4B illustrates a side view of the haptic wearable device 106, in accordance with an embodiment of the present disclosure. FIG. 4C illustrates a top view of the haptic wearable device 106, in accordance with an embodiment of the present disclosure. FIG. 4D illustrates a cross-sectional view of the haptic wearable device 106, in accordance with an embodiment of the present disclosure. FIG. 4E illustrates an exploded view of the haptic wearable device, in accordance with an embodiment of the present disclosure. For the sake of brevity, FIGS. 4A-4E have been explained together.

In an embodiment of the present disclosure, the haptic wearable device 106 has a haptic wearable device lid 402 covering a haptic wearable device casing 404 that houses a Printed Circuit Board (PCB) 420 having a micro-Universal Serial Bus (USB) port 406, an ON/OFF switch 408, a Light Emitting Diode (LED) indicator 410, a pairing button 412, one or more batteries 414, a processing unit 418, a vibration motor 416, a vibration motor connector 422, and a spring antenna 424. The ON/OFF switch 408 may facilitate the at least one second user to turn ON or turn OFF the haptic wearable device 106. Further, such status of ON or OFF may be indicated via the LED indicator 410, for example, the LED indicator 410 may be red when the haptic wearable device 106 is turned OFF and may be green when the haptic wearable device 106 may be turned ON. The pairing button 412 facilitates the pairing of the haptic wearable device 106 with triggering devices 102, such as by way of pressing, sliding, or touching. For example, the pairing button 412 may be pressed once or twice for pairing with the triggering device 102. Such pairings can be by way of any wireless technology like, without any limitation, Bluetooth, Infrared, or Zigbee. In an embodiment of the present disclosure, the haptic wearable device casing 404 may be a rectangular casing having ports on the sides for the ON/OFF switch 408, the LED indicator 410, and the micro-USB port 406 to recharge the one or more batteries to supply operation power to the encased components.

Figure 5A:
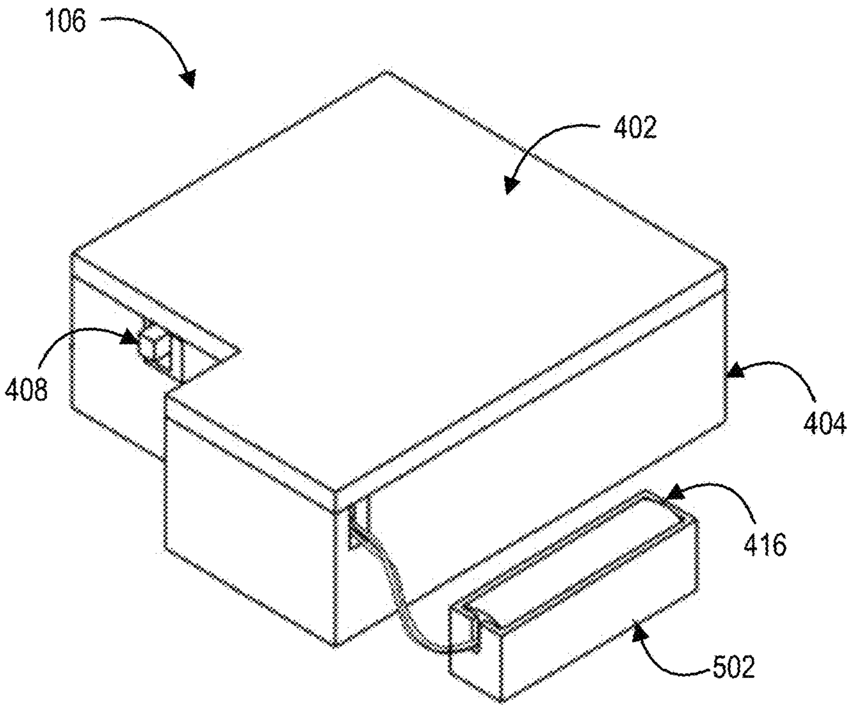
FIG. 5A illustrates a perspective view of the haptic wearable device, in accordance with another embodiment of the present disclosure.
Figure 5B:
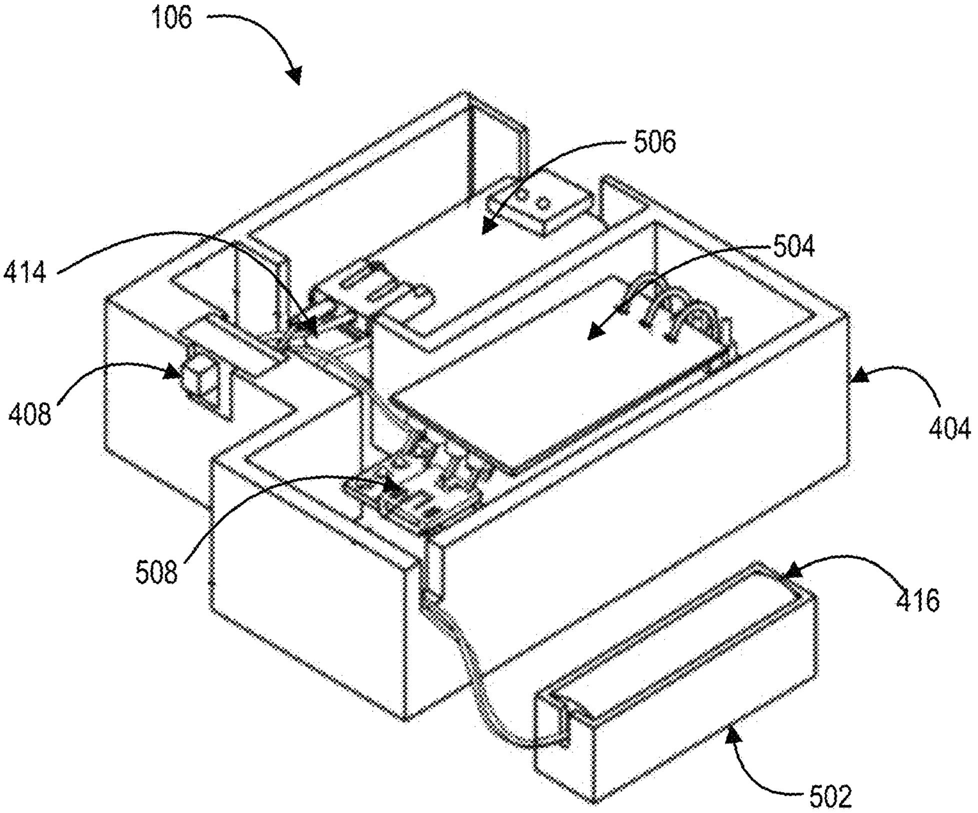
FIG. 5B illustrates a cross-sectional view of the haptic wearable device, in accordance with another embodiment of the present disclosure.
Figure 5C:
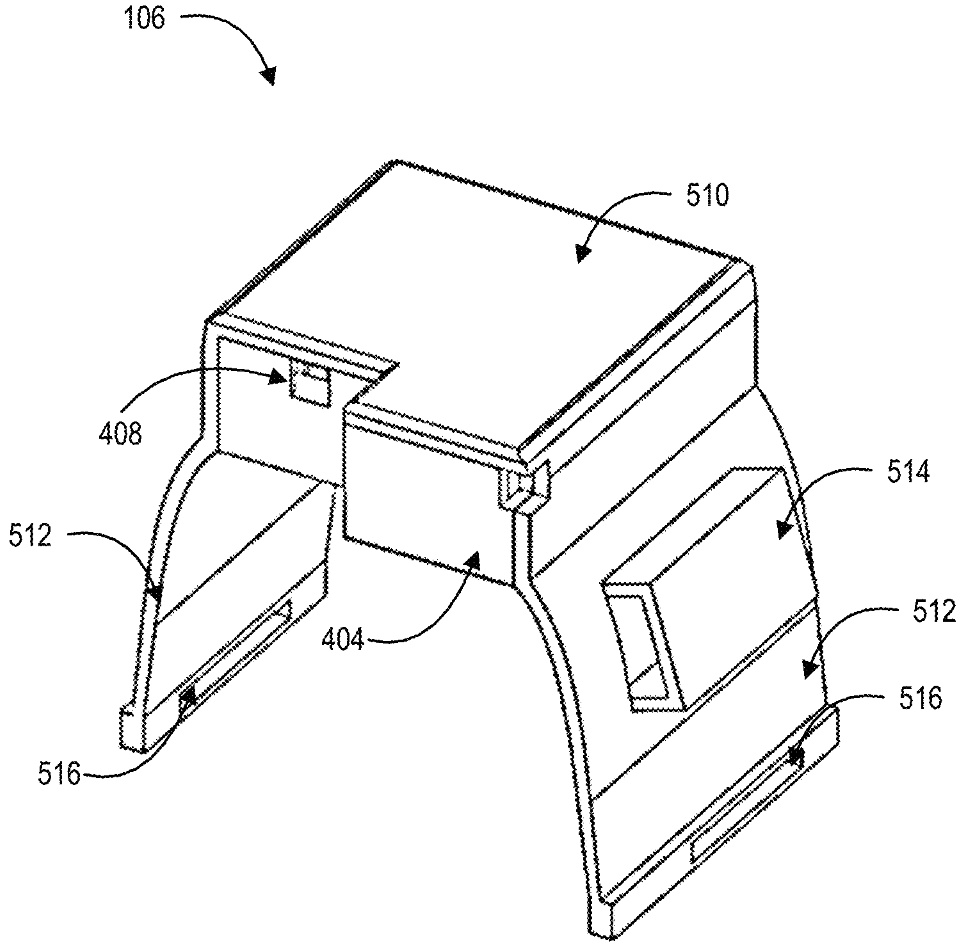
FIG. 5C illustrates a perspective view of the haptic wearable device with flexible wings, in accordance with another embodiment of the present disclosure.

In an embodiment of the present disclosure, the radio transceiver of the haptic wearable device 106 may be coupled to the spring antenna 424 to receive the transmitted radio frequency signal. Further, the processing unit 418 may identify an instruction associated with the received radio frequency signal to instruct the vibration motor 416, that is coupled to the processing unit 418 via the vibration motor connector 422, to generate a corresponding vibration based on the received radio frequency signal to notify the at least one second user about the one or more instructions by the first user. In some embodiments, the vibration motor 416 may be an Eccentric Rotating Mass (ERM) vibration motor or a Linear Resonant Actuator (LRA) for providing haptic output to the second user via one or more vibrations. It may be noted that each of the one or more haptic wearable devices 106 may connect with two or more triggering devices 102 at a point of time FIG. 5A illustrates a perspective view of the haptic wearable device 106, in accordance with another embodiment of the present disclosure. FIG. 5B illustrates a cross-sectional view of the haptic wearable device 106, in accordance with another embodiment of the present disclosure. FIG. 5C illustrates a perspective view of the haptic wearable device with flexible wings, in accordance with another embodiment of the present disclosure. For the sake of brevity, FIGS. 5A-5C have been explained together. In another embodiment of the present disclosure, as shown in FIGS. 5A-5C, the haptic wearable device casing 404 may include the micro-USB port 406, the ON/OFF switch 408, the LED indicator 410, the pairing button 412, the one or more batteries 414, a radio transceiver 504, a USB-C charging module 506, and a processing unit 508. Such haptic wearable device casing 404 may be covered by the haptic wearable device lid 402. Further, the haptic wearable device 106 may include a motor casing 502 for securing the vibration motor 416. The haptic wearable device casing 404 may be separate from the motor casing 502, such that the motor casing 502 may be smaller and may have more independent movement in comparison to the haptic wearable device casing 404 and can be placed appropriately for improving the delivery of haptic feedbacks to the second user. In an embodiment of the present disclosure, the processing unit 508 may vary the intensity of vibrations of the vibration motor 416 based on the location of placement of the motor casing 502 to further improve the delivery of the haptic feedback to the second user.

In an embodiment of the present disclosure, the processing unit 508 may be an Arduino Nano processor, and the radio transceiver 504 may be an nRF24L01 radio transceiver. In a scenario, the one or more batteries 414 may be a LiPo battery that may connect to the USB-C charging module 506 before wiring to the processing unit 318. The ground wire may directly connect the GND pins on the USC-C charging module 506 and the Arduino Nano, the power wire may connect the BAT pin to the ON/OFF switch 408, then a resistor, and a voltage pin on the processing unit 318. In one scenario, when the ON/OFF switch 408 is toggled to the right, the processing unit 318 is powered and the device is on, and vice versa. Further, a power wire of the vibration motor 416 and the ground wire connects to the processing unit 318 in the haptic wearable device casing 404. Once all the electronics are in place within the haptic wearable device casing 404, the haptic wearable device lid 402 snaps on top of the haptic wearable device casing 404 to hold everything down securely. In some embodiments, extrusions on the underside of the haptic wearable device lid 402 contour to the compartments of the haptic wearable device casing 404 underneath to prevent the haptic wearable device lid 402 from sliding around.

In some embodiments, as illustrated in FIG. 5C, the vibration motor 416 may be separate from the haptic wearable device casing 404 and may be placed on a flexible haptic wearable lid 510 with one or more flexible wings 512. Such one or more flexible wings may, without any limitation, be made from Thermoplastic polyurethane (TPU) plastic. Either of the one or more flexible wings 512 may have an indent 514 for the vibration motor 416 to rest in and the flexible wings 512 may be intended to add structure to the haptic wearable device 106. Further, the one or more flexible wings 512 may also allow wrapping of the haptic wearable device 106 around the athlete's ankle when it is worn. Such wrapping may be done by attaching a band via a loop 516 on each of the one or more flexible wings 512.

Figure 6A:
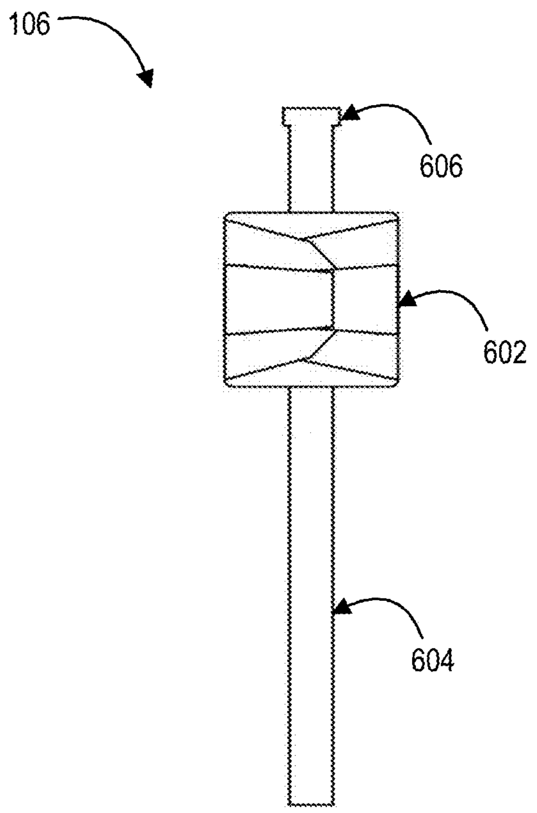
FIG. 6A illustrates a perspective view of the haptic wearable device with a custom-sewn fabric band, in accordance with another embodiment of the present disclosure.
Figure 6B:
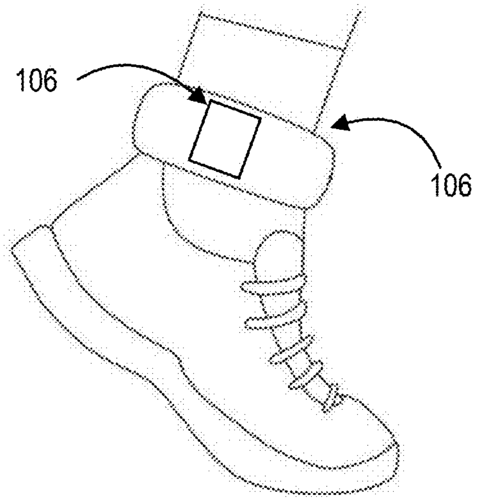
FIG. 6B illustrates the haptic wearable device being worn on an ankle, in accordance with another embodiment of the present disclosure.
Figure 6C:
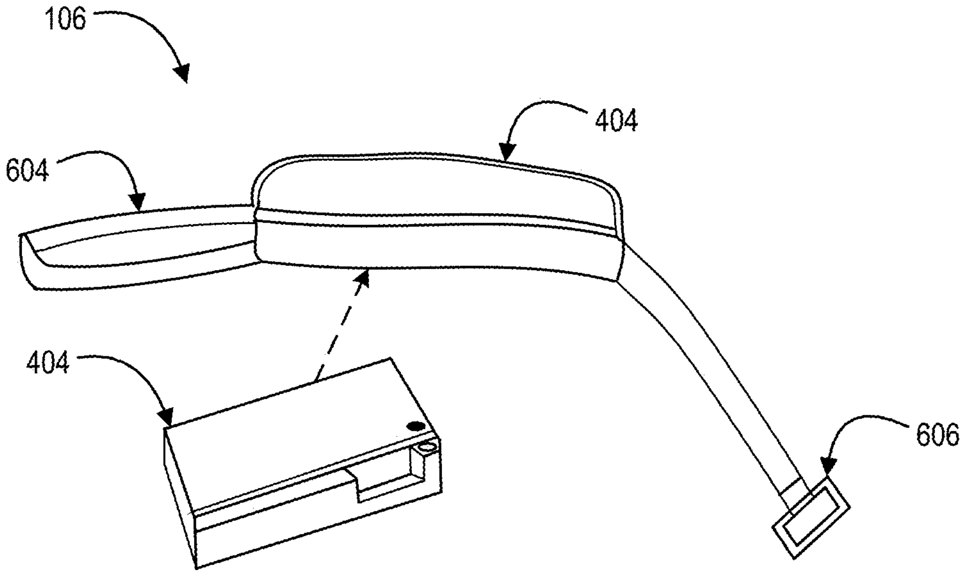
FIG. 6C illustrates a disassembled state of the haptic wearable device, in accordance with another embodiment of the present disclosure.

FIG. 6A illustrates a perspective view of the haptic wearable device 106 with custom-sewn fabric band 604, in accordance with another embodiment of the present disclosure. FIG. 6B illustrates the haptic wearable device 106 being worn on an ankle, in accordance with another embodiment of the present disclosure. FIG. 6C illustrates a disassembled state of the haptic wearable device 106, in accordance with another embodiment of the present disclosure. For the sake of brevity, FIGS. 6A-6C have been explained together. In an embodiment of the present disclosure, the haptic wearable device casing 404 may be stored in a pouch 602 that may be strapped on a player's body part such as an athlete's ankle, as shown in FIG. 6B. It may be noted that such haptic wearable device 106 may be worn on other body parts such as hands, shoulders, torso, or the like based on the requirements of the athlete and/or the corresponding sports. For example, a basketball player may prefer wearing the haptic wearable device 106 on an ankle and a soccer player may prefer wearing the haptic wearable device 106 on the shoulder or waist.

Further, the pouch 602 is attached to a band 604 (hereinafter referred to as a custom-sewn fabric band 604) having a loop 606. The band 604 has a Velcro on one side such that the custom-sewn fabric band 604 moves through the loop 606 and is adjustable using the Velcro. Further, the band 604 may also have a layer of foam padding on the exterior to prevent hazards and collisions with solid haptic wearable device casing 404. In an embodiment, the custom-sewn band 604 includes a pouch to secure the haptic wearable device casing 404. In such embodiments, the vibration motor 416 may be contained within the haptic wearable device casing 404, such that the haptic wearable device 106 is contained in a single casing and single pouch. In another embodiment, the custom-sewn fabric band 604 may include a separate small pouch to store the vibration motor 416. In some embodiments, the custom-sewn fabric band 604 may be made of a cotton-polyester fabric blend or a spandex-polyester fabric blend. In an illustrated embodiment, as shown in FIG. 6C, in order to wear the haptic wearable device 106, the haptic wearable device casing 404 may first be stored in the pouch 602 and then the custom-sewn fabric band 604 may be used to strap the haptic wearable device 106 using the loop 606 and Velcro. Similarly, the athlete can also unstrap the haptic wearable device 106 and remove the haptic wearable device casing 404 along with all the electronic components to replace the custom-sewn fabric band 604, or wash the custom-sewn fabric band 604.

Figure 7:
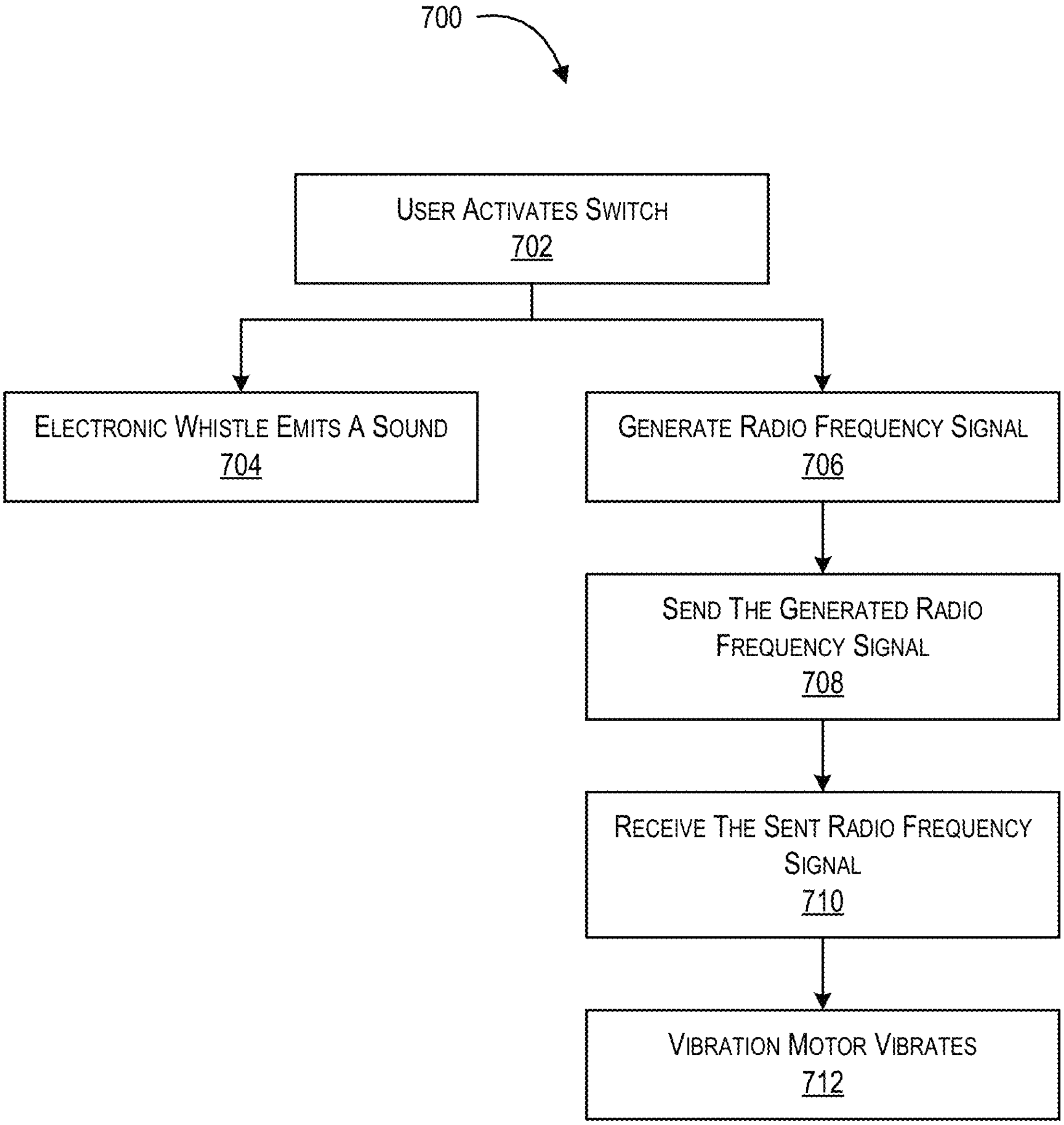
FIG. 7 illustrates a flow chart of an operation of the communication system for athletes or hearing-impaired users, in accordance with an embodiment of the present disclosure.

FIG. 7 illustrates a flow chart 700 of an operation of the communication system for athletes or hearing-impaired users, in accordance with an embodiment of the present disclosure.

At first, the first user may activate a switch on the triggering device, at step 702. The activation of the switch triggers the electronic whistle and the triggering device. As a result, the electronic whistle emits a sound, at step 704, and generates a radio frequency signal, at step 706. It may be noted that the emission of the sound from the electronic whistle allows communication of the first user with at least one second user via sound. Also, it may be noted that the generation of the radio frequency signal may allow communication of the first user with the at least one second user wirelessly through haptic feedback. For such wireless communication through haptic feedback, the triggering device may send the generated radio frequency signal to one or more haptic wearable devices associated with the at least one second user, at step 708.

In an embodiment, the one or more haptic wearable devices may receive the generated radio frequency signal, at step 710. Upon receiving the radio frequency signal, the haptic wearable device may identify the one or more instructions associated with the radio frequency signal and identify the intensity of the vibration required to successfully provide the haptic feedback to the at least one second user. Thereafter, based on the identified one or more instructions and the identified intensity of the vibration, the haptic wearable device vibration motor provides the haptic feedback to the at least one second user, at step 712.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . . And N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

We claim:

1. A triggering device for a communication system, the triggering device comprises:

a triggering switch activable by a first user to convey instruction wirelessly to at least one second user;

a processing unit to generate a first control signal for the generation of a sound and a second control signal for generation of a radio frequency signal in response to the activation of the triggering switch, wherein the radio frequency signal generates haptic feedbacks through a corresponding haptic wearable device;

a sound generation unit to generate, based on the first control signal, the sound for communicating with the at least one second user;

a radio transceiver to generate and transmit, based on the second control signal, the radio frequency signal; and a spring antenna coupled to the radio transceiver to boost transmission range of the generated radio frequency signal, wherein the transmitted radio frequency signal causes one or more haptic wearable devices associated with the at least one second user to generate haptic feedbacks for notifying the at least one second user about the one or more instruction by the first user.

2. The triggering device as claimed in claim 1, wherein the triggering switch having one or more distinct activations associated with one or more distinct instructions intended by the first user.

3. The triggering device as claimed in claim 1, wherein the sound generation unit is at least one of: an electronic whistle, an active buzzer, and a passive buzzer.

4. The triggering device as claimed in claim 1, further comprises one or more batteries to supply an operation power to one or more components of the triggering device.

5. The triggering device as claimed in claim 1, wherein the first user includes at least one of: a team member, a coach, and a match official.

6. The triggering device as claimed in claim 1, wherein the at least one second user corresponds to at least one of: an athlete and a hearing-impaired user, and the second user is associated with a sport selected from a group of sports including:

football, soccer, volleyball, basketball, baseball, hockey, tennis, and cricket.

7. The triggering device as claimed in claim 1, wherein the triggering switch includes at least one of: a pressable switch, a touch-sensitive switch, a Single Pole Single Throw (SPST), a Single Pole Double Throw (SPDT), a Double Pole Single Throw (DPST), and a Double Pole Double Throw (DPDT).

8. A communication system comprising:

a triggering device having a housing that has an inside hole, a switch cap, a triggering switch, a main switch, a processing unit, and a radio transceiver, wherein the housing receives an electronic whistle, such that:

the switch cap protrudes outwards from the inside hole and snaps on top of a whistle switch to secure the whistle switch of the electronic whistle, wherein the whistle switch, when activated, triggers a generation of a sound for communicating with at least one second user;

the triggering switch is placed above the inside hole to align with the whistle switch for operating in tandem, wherein the triggering switch, when activated, triggers a generation of a radio frequency signal for communicating with the at least one second user to give one or more instructions;

the main switch sandwiches the triggering switch with the switch cap and is secured by a switch lid, wherein a first user accesses the main switch for simultaneously activating the whistle switch and the triggering switch for operating the electronic whistle and the triggering device in tandem to facilitate the first user for wirelessly communicating with the at least one second user to the give one or more instructions; and the processing unit that is affixed below the radio transceiver for controlling the radio transceiver to generate and transmit a radio frequency signal in response to the activation of the main switch; and one or more haptic wearable devices associated with the at least one second user, each of the one or more haptic wearable devices comprise:

a radio transceiver to receive the transmitted radio frequency signal; and a vibration motor to generate a vibration based on the received radio frequency signal to notify the at least one second user about the one or more instructions by the first user.

9. The communication system as claimed in claim 8, wherein the triggering switch having one or more distinct activations associated with one or more distinct instructions intended by the first user.

10. The communication system as claimed in claim 8, wherein the triggering device further comprises a spring antenna coupled to the radio transceiver to boost transmission range of the generated radio frequency signal.

11. The communication system as claimed in claim 8, wherein the housing having one or more connectors to secure the electronic whistle.

12. The communication system as claimed in claim 8, wherein the triggering device further comprises one or more batteries to supply an operation power to one or more components of the triggering device.

13. The communication system as claimed in claim 8, wherein the whistle switch, the triggering switch, and the main switch include at least one of: a pressable switch, a touch-sensitive switch, a Single Pole Single Throw (SPST), a Single Pole Double Throw (SPDT), a Double Pole Single Throw (DPST), and a Double Pole Double Throw (DPDT).

14. The communication system as claimed in claim 8, wherein each of the one or more haptic wearable devices comprise:

a haptic wearable device casing to encase at least one of: a processing unit, the one or more rechargeable batteries, the radio transceiver, and the vibration motor; and a haptic wearable device lid to snap on top of the haptic wearable device casing and having extrusions on an underside that contour to compartments of the haptic wearable device casing underneath for preventing its sliding around.

15. The communication system as claimed in claim 14, wherein the haptic wearable device casing is a 3D rectangular casing having ports on sides for an ON/OFF switch, a Light Emitting Diode (LED) indicator, and a micro-Universal Serial Bus (USB) port to recharge one or more rechargeable batteries to supply operational power to the encased components.

16. The communication system as claimed in claim 8, wherein each of the one or more haptic wearable devices further comprises a custom-sewn fabric band adjustable using a Velcro and having a layer of foam padding on exterior to prevent hazards and collisions with solid haptic wearable device casing.

17. The communication system as claimed in claim 16, wherein the custom-sewn fabric band further comprises a pouch to secure the haptic wearable device casing and a separate small pouch to store the vibration motor.

18. The communication system as claimed in claim 8, wherein the vibration motor is at least one of: an Eccentric Rotating Mass (ERM) vibration motor and a Linear Resonant Actuator (LRA) for providing haptic output to the at least one second user via one or more vibrations.

19. The communication system as claimed in claim 8, wherein each of the one or more haptic wearable devices connect with at least two triggering devices at a point of time.

20. The communication system as claimed in claim 8, wherein the first user includes at least one of: a team member, a coach, and a match official.

21. The communication system as claimed in claim 8, wherein the at least one second user corresponds to at least one of: an athlete and a hearing-impaired user, and the at least one second user is associated with a sport selected from a group of sports including: football, soccer, volleyball, basketball, baseball, hockey, tennis, and cricket.

22. A triggering device for a communication system, the triggering device comprises:

a housing having an inside hole, a switch cap, a triggering switch, a main switch, a processing unit, and a radio transceiver, wherein the housing receives an electronic whistle, such that:

the switch cap protrudes outwards from the insider hole and snaps on top of a whistle switch to secure the whistle switch of the electronic whistle, wherein the whistle switch, when activated, triggers a generation of a sound for communicating with at least one second user;

the triggering switch is placed above the inside hole to align with the whistle switch for operating in tandem, wherein the triggering switch, when activated, triggers a generation of a radio frequency signal for communicating with the at least one second user to give one or more instructions;

the main switch sandwiches the triggering switch with the switch cap and is secured by a switch lid, wherein a first user accesses the main switch for simultaneously activating the whistle switch and the triggering switch for operating the electronic whistle and the triggering device in tandem to facilitate the first user for wirelessly communicating with the at least one second user to give one or more instructions; and the processing unit that is affixed below the radio transceiver for controlling the radio transceiver to generate and transmit a radio frequency signal in response to the activation of the main switch, wherein the transmitted radio causes one or more haptic wearable devices associated with the at least one second user to generate haptic feedbacks for notifying the at least one second user about the one or more instructions by the first user.

23. The triggering device as claimed in claim 22, wherein the triggering switch having one or more distinct activations associated with one or more distinct instructions intended by the first user.

24. The triggering device as claimed in claim 22, further comprises a spring antenna coupled to the radio transceiver to boost the transmission range of the generated radio frequency signal.

25. The triggering device as claimed in claim 22, wherein the housing having one or more connectors to secure the electronic whistle.

26. The triggering device as claimed in claim 22, further comprises one or more batteries to supply an operation power to one or more components of the triggering device.

27. The triggering device as claimed in claim 22, wherein the first user includes at least one of: a team member, a coach, and a match official.

28. The triggering device as claimed in claim 22, wherein the at least one second user corresponds to at least one of: an athlete and a hearing-impaired user, and the at least one second user is associated with a sport selected from a group of sports including: football, soccer, volleyball, basketball, baseball, hockey, tennis, and cricket.

29. The triggering device as claimed in claim 22, wherein the whistle switch, the triggering switch, and the main switch include at least one of: a pressable switch, a touch-sensitive switch, a Single Pole Single Throw (SPST), a Single Pole Double Throw (SPDT), a Double Pole Single Throw (DPST), and a Double Pole Double Throw (DPDT).

* * * * *